3,213,066
POLYMERIZATION OF 2-PYRROLIDONE TO GRANULAR POLYMER

Edgar Earl Renfrew, Jr., Monroeville, Pa., assignor to General Aniline & Film Corporation, New York, N.Y., a corporation of Delaware
No Drawing. Filed Feb. 16, 1962, Ser. No. 173,822
5 Claims. (Cl. 260—78)

This invention relates to an improved method for the polymerization of 2-pyrrolidone.

Polypyrrolidone, produced by the polymerization of 2-pyrrolidone, is a known material. Methods for producing it have previously been disclosed in U.S. Patent Nos. 2,638,463, 2,739,959, 2,806,856, and 2,809,958. In general, these methods involve the polymerization of 2-pyrrolidone in the presence of a catalyst and an initiator. The catalyst is usually an alkali metal pyrrolidone produced by the addition to 2-pyrrolidone of an alkali metal, such as sodium or potassium, or the corresponding hydroxides or carbonates of the alkali metals. As the initiator for starting chain growth in the polymerization reaction, there can be used an acyl pyrrolidone or any of the other materials known to the art for such purpose, such as N-acetyl-2-pyrrolidone, N,N'-adipoyl-dipyrrolidone, benzoyl chloride, cyanuric chloride, silicon tetrachloride, titanium tetrachloride, and the like. Polymerization can be carried out in bulk, i.e., with no suspending medium or with stirring in a non-reactive, non-polar suspending material, such as n-heptane or any other aliphatic hydrocarbon.

While these prior methods gave yields of polymer of about from 55–60%, they had certain disadvantages which reduced their practicability for large scale industrial application. Because it is desirable to obtain the polymer in finely divided form, it was necessary to carry out the polymerization while stirring at high speed. It was therefore necessary to provide an efficient bearing for the stirrer in the reaction vessel. Bearing lubricants sometimes contaminated the reaction mixture and acted as chain terminators.

Another disadvantage arose from the nature of the reaction mixture itself. Pyrrolidone, while polymerizing, goes through a plastic stage during which it adheres strongly to itself and to most surfaces, especially glass and steel. Elaborate procedures have been necessary to coat these surfaces to make them essentially non-sticking.

Still another disadvantage, encountered especially in the bulk polymerization, was the production of a single hard lump of polymer which had to be dissolved in an acid, such as formic acid, and then reprecipitated to obtain it in a usable form. This required much time and also introduced the danger that the polymer might undergo some acid degradation.

One object of the present invention, therefore, is to provide a method for carrying out the polymerization of pyrrolidone which yields the polymer directly in a finely-divided form. Another object is to produce the polymer in a finely-divided form without the necessity of using externally driven mechanical stirring devices inside the reaction mixture. A further object is to provide a method for polymerizing pyrrolidone in increased yield and without the danger of introducing contaminants which will have an adverse effect on the polymerization reaction. Still another object is to provide a method of polymerization which will eliminate or greatly reduce the need for post-polymerization treatment and which will thus result in greater economies of both time and materials.

Other advantages and objects will become apparent to those skilled in the art from the description of the invention which follows.

In general, in accordance with the present invention, the foregoing objects and advantages are achieved by carrying out the polymerization, either in bulk or in suspension in an apparatus which is essentially a ball mill. This is accomplished by charging the reactants into a cylinder partly filled with small balls or other inert small objects, preferably of glass, ceramic material, or steel, and rotating the cylinder about its axis while the polymerization reaction proceeds. When the reaction is carried out by this procedure, there is no opportunity to introduce contamination, and the polymer unexpectedly does not stick either to the sides of the vessel of to the balls. In addition, conversions of about from 69 to 75% are achieved, and the polymer is obtained in a finely-divided form which is far superior to the prior forms since it increases the efficiency of catalyst and monomer removal by washing with water.

The invention will be illustrated by the following examples which, it will readily be recognized, are merely illustrative and not limiting on the scope of the invention. "Parts" means parts by weight.

Example 1

837 parts of potassium hydroxide was added to 100,000 parts of 2-pyrrolidone. The resulting mixture was heated under vacuum to remove water and produce potassium pyrrolidone. It was then charged, together with 200,000 parts of n-heptane and 1530 parts of 1-acetyl-2-pyrrolidone, into a suitable dry cylindrical vessel capable of being rotatel on its axis and containing about half its apparent volume of one-half inch diameter steel balls.

The vessel was rotated for two hours, during which time a white finely-divided solid was formed from the pyrrolidone layer. After standing for sixty-three more hours the balls were screened out and most of the heptane removed by suction filtration from the reaction mixture. The cake of finely-divided solid particles was washed with methanol and then with water until substantially all potassium ions were removed.

A yield of 76,000 parts of polymer having a relative viscosity of 3.4 (1%, m-cresol) was obtained.

Example 2

2340 parts of potassium hydroxide was added to 100,000 parts of 2-pyrrolidone and the water formed in the reaction was removed by distillation at 1 mm. pressure.

The resulting mixture of 2-pyrrolidone and potassium pyrrolidone was charged into a suitable vessel containing about half its apparent volume of glass balls of five-eighths inch diameter. 1120 parts of benzoyl chloride was then added at a temperature of about from 60°–100° C. and the vessel rotated for about three minutes. During this time the liquid charge became very viscous and nearly solid. 200,000 parts of n-heptane was then added and the vessel rotated for twenty-four hours.

When rotation ceased, the balls were screened from the polymer-heptane mixture and the heptane removed by filtration. Elution of the resulting white powder with methanol and then with water yielded a material essentially free of potassium ions which was then dried. 80,000 parts of dry polymer having a relative viscosity of 5.0 (1% in m-cresol) was obtained.

Example 3

10,000 parts of 2-pyrrolidone containing 234 parts of potassium pyrrolidone was added to a suitable vessel half-filled with one-half inch diameter steel balls. To this was added 112 parts of N,N'-adipyl-pyrrolidone and the vessel rotated for twenty-four hours. During this time the liquid first became viscous, and then solid. At the end of the twenty-four hours the balls were separated by screening, the polymer was purified by washing with water to remove unchanged 2-pyrrolidone and potassium ions, and then dried.

A yield of 8300 parts of polymer having a relative viscosity of 5.1 (1% in m-cresol) was obtained. About two-thirds of the material passed a thirty-five mesh screen without further treatment.

*Example 4*

2340 parts of potassium hydroxide was added to 100,000 parts of 2-pyrrolidone and the water produced in the reaction was removed by heat and vacuum.

The resulting mixture of 2-pyrrolidone and potassium pyrrolidone was charged into a suitable cylindrical vessel containing about half its apparent volume of five-eighths inch diameter glass balls. To this was added 660 parts of benzoyl chloride at a temperature above 60° C. but below 100° C. and the cylinder then rotated in the manner of a ball mill. After five minutes the organic material became thick and pasty. After twenty-five minutes it achieved a thick tar-like consistency. A grainy structure was apparent after one and one-half hours; and after two and a half hours the material was milling as a powder. The reaction was terminated after six hours by exposure to moist air and the polymer was isolated as described in the foregoing examples.

A yield of solid polymer in powdered form, representing a conversion of 55.5% of the initial 2-pyrrolidone and having a relative viscosity of 7.1 (1% in m-cresol), was obtained.

*Example 5*

A charge of the same size and proportions as in Example 3 was placed in a similar apparatus and milled for only twenty-five minutes. The contents of the cylinder were pasty but non-sticky. The polymer was isolated as previously described by washing first with methanol and then with water until free of potassium ions and unreacted pyrrolidone and then dried.

The solid polymeric material isolated had a relative viscosity of 1.8 (1% in m-cresol) and its weight represented a conversion of 35.7% of the original 2-pyrrolidone.

*Example 6*

318 parts of potassium hydroxide was added to 10,000 parts of 2-pyrrolidone and the water produced in the reaction was removed. To the resulting mixture of 2-pyrrolidone and potassium pyrrolidone was added 228 parts of dodecyltrichlorosilane at 100° C., the mixture permitted to stand for three minutes, cooled, and then charged into a suitable mill-type vessel containing approximately half its apparent volume of three-eighths inch diameter steel balls. To the contents of the mill was added 25,000 parts of mineral oil having a Saybolt viscosity of 350–380 and the mill rotated for twenty-four hours. At the end of that time the product was isolated by filtration and washed successively with benzene, methanol, and water.

A yield of 7400 parts of dry polymer having a relative viscosity of 4.2 (1% in m-cresol) was obtained.

*Example 7*

The process as described in Example 6 was repeated except that a mineral oil having a Saybolt viscosity of 65–75 was used in place of the more viscous oil. There was obtained a polymer having a relative viscosity of 5.8 (1% in m-cresol) in virtually the same yield.

*Example 8*

318 parts of potassium hydroxide was added to 10,000 parts of 2-pyrrolidone and the water formed was removed by distillation. The resulting mixture of 2-pyrrolidone and potassium pyrrolidone was charged into a suitable milling vessel partly filled with warm steel spheres. The temperature of the contents of the vessel due to the warm steel spheres was above 60° C., but lower than 100° C. There was then added 218 parts of dodecyltrichlorosilane, and the vessel was rotated but not heated further. After two hours, the organic material in the vessel had attained a solid powdery structure. At the end of the twenty-four hours milling, the material was isolated, washed with water and dried. A yield of 7000 parts of polymer was obtained which had a relative viscosity of 6.2 (1% in m-cresol).

*Example 9*

Example 8, above, was repeated except that, to the above described materials, there was added 6667 parts of n-heptane.

The mill was rotated for twenty-four hours. The finely-divided product which had formed was collected by filtration and leached successivly with benzene, methanol, and water, after which it was dried. A dry weight yield of 6950 parts was obtained of a polymer having a relative viscosity of 9.1 (1% in m-cresol).

*Example 10*

The process of Example 9 was repeated except that the reaction mixture was milled for only 140 minutes.

The product, isolated as described above consisted of 2200 parts of a polymer having a relative viscosity of 5.0 (1% in m-cresol).

*Example 11*

30 parts of potassium hydroxide was added to 1000 parts of 2-pyrrolidone and the reaction mixture dried. The resulting mixture of 2-pyrrolidone and potassium pyrrolidone was placed in a suitable vessel containing about half its apparent volume of 5/8 inch glass spheres. 12 parts of dodecyltrichlorosilane was then added and the mill rotated. At the end of 40 minutes 1333 parts of n-heptane was added to the contents of the vessel and the latter was then rotated for 48 hours more.

After filtering, leaching, and drying, as described in Example 9, 585 parts of a fine white powdered polymer was obtained which had a relative viscosity of 9.2 (1% in m-cresol).

*Example 12*

2300 parts of potassium hydroxide was added to 99,500 parts of 2-pyrrolidone and the reaction mixture freed of water. The resulting mixture of 2-pyrrolidone and potassium pyrrolidone was charged into a suitable vessel containing about half its apparent volume of 5/8 inch glass balls and 484 parts of cyanuric chloride and 200,000 parts of n-heptane were added.

The mill was rotated. After 20 minutes a coarse granular material appeared suspended in the heptane layer. At the end of 40 minutes the grain had become extremely fine in texture. Milling was continued for 23 hours and 20 minutes longer.

The powder was separated from the glass balls and the heptane, then leached once with methanol and five times with water. After drying, 74,000 parts of a powdered polymer was obtained which had a relative viscosity of 5.8 (1% in m-cresol).

In all of the foregoing examples, the potassium pyrrolidone was produced, for convenience, in situ by merely adding the proper amount of potassium hydroxide to the total charge of 2-pyrrolidone which it was desired to polymerize followed by removal of water. As will readily be apparent to those skilled in the art, the potassium pyrrolidone need not be produced in situ at all; but can be prepared separately and then added to the charge of 2-pyrrolidone.

As shown by the examples, the product was obtained directly as a finely powdered polymer, whether the polymerization was carried out in bulk or in the presence of n-heptane or mineral oil liquid suspending agents, without the necessity of post-polymerization treatment other than the usual washing and drying steps.

It is to be understood that the forgoing detailed description is given merely by way of illustration and that many variations may be made therein without departing from the spirit of this invention.

What is desired to be secured by Letters Patent is:

1. In a process for producing polypyrrolidone by the polymerization of 2-pyrrolidone in the presence of an alkali metal pyrrolidone catalyst and a chain-growth initiator selected from the group consisting of 1-acetyl-2-pyrrolidone, benzoyl chloride, N,N'-adipyl-dipyrrolidone, dodecyltrichlorosilane, silicon tetrachloride, titanium tetrachloride, and cyanuric chloride, the improvement which comprises carrying out the polymerization while agitating the reaction mixture in a rotating vessel partly filled with freely moveable spheres of a solid inert material having a diameter in the range of from about 3/8 to about 5/8 inch to provide a granular polypyrrolidone product, and separating the polypyrrolidone product from the reaction mixture and said inert spheres.

2. The method according to claim 1 wherein said spheres are formed of an inert material selected from the group consisting of steel, glass, and ceramic materials.

3. The method according to claim 1 wherein preliminary to said separation of said polypyrrolidone product from said vessel said rotation of said vessel is continued for a time period requisite to provide a powdered polypyrrolidone product.

4. The method according to claim 1 wherein said reaction mixture also contains a non-reactive, non-polar suspending liquid.

5. The method according to claim 4 wherein the non-reactive, non-polar suspending liquid is n-heptane.

References Cited by the Examiner

UNITED STATES PATENTS

| | | | |
|---|---|---|---|
| 2,779,752 | 1/57 | Vining | 260—95 |
| 2,809,958 | 10/57 | Barnes et al. | 260—78 |
| 2,891,038 | 6/59 | Barnes et al. | 260—78 |
| 2,999,852 | 9/61 | Renfrew et al. | 260—78 |
| 3,003,985 | 10/61 | Black | 260—78 |
| 3,022,274 | 2/62 | Glickman et al. | 260—78 |
| 3,028,369 | 4/62 | Butler et al | 260—78 |
| 3,058,968 | 10/62 | Soderquist et al. | 260—95 |
| 3,061,592 | 10/62 | Schnell et al. | 260—78 |

FOREIGN PATENTS 167,712    5/56    Australia.

WILLIAM H. SHORT, *Primary Examiner.*
LOUISE P. QUAST, *Examiner.*